United States Patent [19]

Fradenburgh

[11] 4,323,332
[45] Apr. 6, 1982

[54] HINGELESS HELICOPTER ROTOR WITH ELASTIC GIMBAL HUB

[75] Inventor: Evan A. Fradenburgh, Fairfield, Conn.

[73] Assignee: United Technologies Corporation, Hartford, Conn.

[21] Appl. No.: 106,215

[22] Filed: Dec. 21, 1979

[51] Int. Cl.³ .............................................. B64C 27/52
[52] U.S. Cl. .................. 416/134 A; 416/141; 416/102; 416/148
[58] Field of Search .................. 416/134 A, 141, 102, 416/148, 245 R, 20 A, 138 A

[56] References Cited

U.S. PATENT DOCUMENTS

| | | | |
|---|---|---|---|
| 2,210,190 | 8/1940 | Stanley | 416/245 |
| 2,961,051 | 11/1960 | Wilford | 416/102 |
| 3,130,942 | 4/1964 | Fradenburg | 416/245 R X |
| 3,228,479 | 1/1966 | Nagler | 416/149 |
| 3,804,552 | 4/1974 | Covington | 416/138 A X |
| 3,933,324 | 1/1976 | Ostrowski | 416/129 X |
| 4,047,839 | 9/1977 | Ferris et al. | 416/134 A |
| 4,189,283 | 2/1980 | McCoubrey | 416/141 X |

FOREIGN PATENT DOCUMENTS

| | | |
|---|---|---|
| 1262783 | 3/1968 | Fed. Rep. of Germany ... 416/138 A |
| 2606424 | 8/1977 | Fed. Rep. of Germany ...... 416/123 |
| 811394 | 4/1937 | France ................. 416/123 |
| 931198 | 2/1948 | France ................. 416/102 |
| 972677 | 8/1950 | France ................. 416/141 |

*Primary Examiner*—Everette A. Powell, Jr.
*Attorney, Agent, or Firm*—Vernon F. Hauschild

[57] ABSTRACT

A hingeless helicopter rotor including an aerodynamically shaped hub having a flexible diaphragm as its bottom wall, which diaphragm is connected to the rotor drive shaft and is elastically deformable in response to blade loading to tilt in any direction with respect to the axis of rotation, and further having at least three equally spaced helicopter blades projecting from and supported from within the hub for rotation therewith and for flexing with respect thereto in response to blade loading so that the flexible hub and the blades coact to produce a low equivalent offset rotor and minimized Coriolis effect.

12 Claims, 12 Drawing Figures

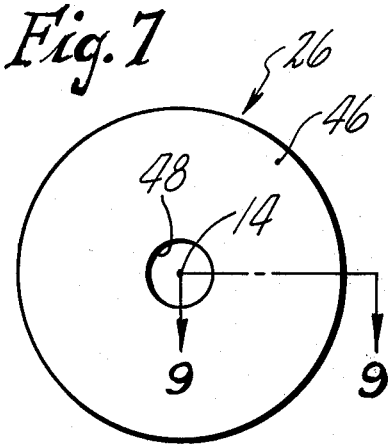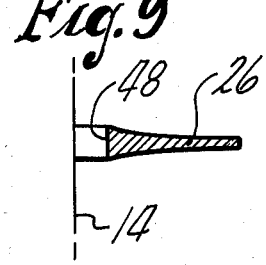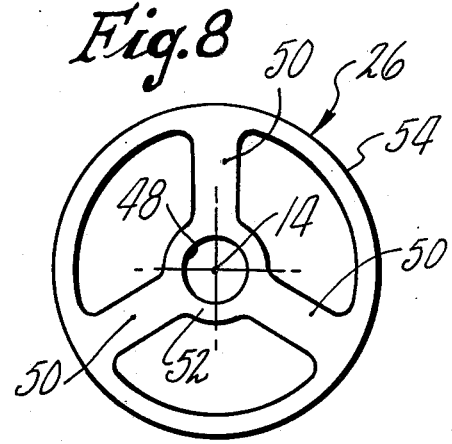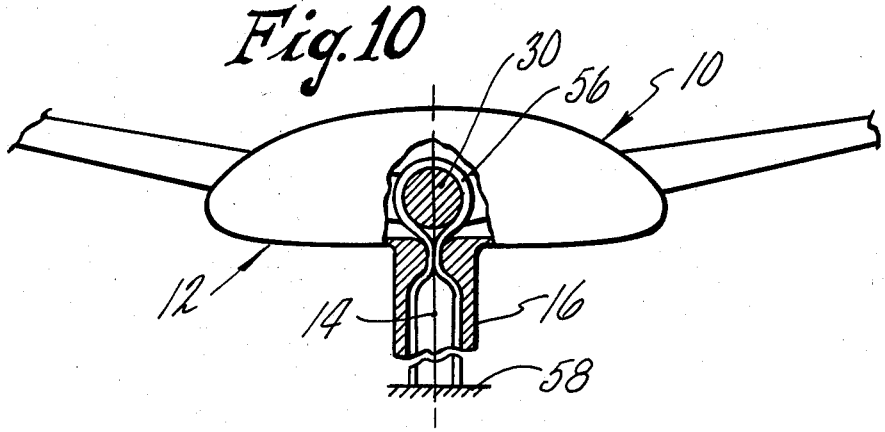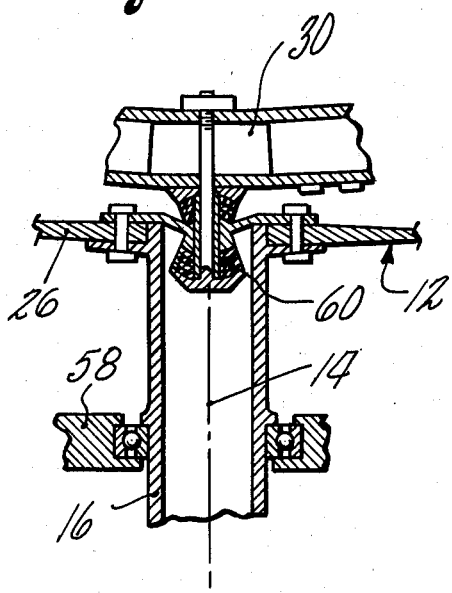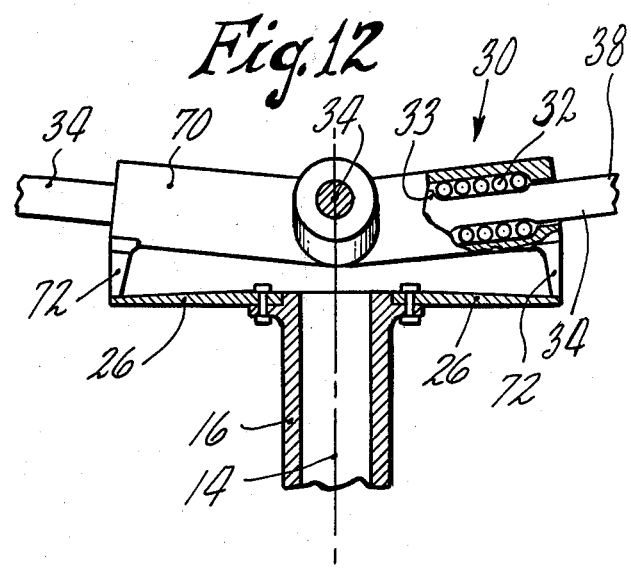

HINGELESS HELICOPTER ROTOR WITH ELASTIC GIMBAL HUB

BACKGROUND OF THE INVENTION

1. Field of Invention

This invention relates to helicopter main or tail rotors and particularly to hingeless rotors having low equivalent offset.

2. Description of the Prior Art

In the helicopter rotor art, it has been conventional practice to support the rotor blade from the rotor hub about fixed hinges of the type shown in U.S. Pat. No. 2,984,306. In this hinged rotor art, it has been established that the ratio of the radial offset of the hinge from the axis of rotation to the radius of the blade, known as the offset ratio, has a distinct bearing upon rotor vibration and rotor wind gust responsiveness. Hinged rotors with low offset ratio demonstrate acceptably low vibrations and wind gust responsiveness while having adequate control movement capability for required maneuvers. For most hinged rotors the offset ratio should be between 3 and 7 percent. Hinged rotors with offset ratios substantially in excess thereof experience vibration problems and high sensitivity to wind gusts.

With the advent of hingeless rotors, which have the advantage of eliminating the mechanical complication and lubrication requirements of the prior art hinged rotors an equivalent offset is produced and the equivalent offset ratio must be controlled in hingeless rotors, just as in hinged rotors, to avoid the rotor vibration problem and wind gust sensitivity problem which accompanies high equivalent offset ratio rotors.

It can be demonstrated that hingeless rotors having stiff blades have high equivalent offset ratio, whereas, hingeless rotors with highly flexible blades have low equivalent offset or offset ratio.

If we attempt to achieve low offset in a hingeless rotor by using very flexible blades, we encounter three serious problems. Very flexible blades encounter high stress concentration at the interface between the hub and the blade. Secondly, very flexible blades produce severe static droop. This problem is accentuated by the fact that attempts to start-up or stop a helicopter rotor having highly flexible blades in a high wind condition produces excessive blade flapping due to wind gusting which could prevent the helicopter rotor from being stopped or started up. These static droop and wind gust flapping problems could be overcome by the incorporation of additional hardware of the type used in hinged rotors, but this would defeat the concept of a hingeless rotor whose purpose is to avoid the complication and hardware of the prior art hinged rotor. The third disadvantage of the use of a highly flexible blade is that, when the blade flaps up out of the plane of rotation, which is the plane perpendicular to the rotor axis of rotation, a Coriolis effect takes place and causes the blade flapping motion to be coupled with a lead-leg motion and results in in-plane vibration.

If we were to use a purely mechanical gimballed rotor, in which the rotor hub and blades are able to pivot in gimbal motion about the gimballed joint connecting the rotor to the helicopter for pivot motion about a given line, such a construction would have zero offset but, unfortunately, produce inadequate aircraft control under some flight conditions as well as Coriolis problems. Typically of the mechanically gimballed rotors is Covington U.S. Pat. No. 3,804,552, which joins the helicopter rotor to the fuselage through a simple universal or Hooke's joint. Such a simple universal connection is not a constant-speed universal and therefore will have 2/rev. variations in rotor rpm for constant drive shaft rpm when the rotor is tilted relative to the drive shaft. While Covington uses an elastomeric hub spring to transmit pitching and rolling moments between the rotor and the drive shaft, this spring does not transmit torque from the shaft to the blades since this function is performed by Covington's mechanical gimbal which produces the aforementioned 2/rev. variations in rotor rpm when the rotor is tilted relative to the shaft. While these problems with mechanically gimballed rotors can be compensated for, each such compensation imposes a design restraint which can be avoided with my construction. For example, the drive shaft of Covington could be made torsionally flexible to allow a 2/rev. torsional windup in order to reduce the severity of the Coriolis effect.

Doman U.S. Pat. No. 3,082,824 utilizes a flexible boot to transmit torque between a tail rotor drive shaft and a tail rotor, but requires a spherical bearing to support the tail rotor for gimbal motion thereabout, to perform the rotor centering function and to perform all other rotor load carrying functions, except torque transmission. While the axially offset flexible boot of Doman may be able to carry the minimal torque required by a helicopter tail rotor, it can not transmit the very substantial torque required in a helicopter main rotor, and to design the Doman flexible boot to be able to transmit main rotor torque would present very substantial design problems. The Doman flexible boot must be highly flexible since his primary objective is understood to be to achieve zero offset or very small offset so as to relieve stresses in the tail rotor blades. U.S. DuPont U.S. Pat. No. 3,080,002 is similar to Doman and also requires the spherical bearing shown therein to perform the various functions discussed supra concerning Doman.

SUMMARY OF THE INVENTION

A primary object of the present invention is to provide a low-cost, lightweight, low-drag, simplified hingeless rotor system which will provide the benefits of low vibration and minimized wind gust response associated with low hinge offset, but which permits the use of relatively stiff hingeless blades to avoid the problems discussed supra which are associated with highly flexible blades.

It is a further object of this invention to teach such a hingeless helicopter rotor in which the hub has a lower surface which is substantially flat, and forms a flexible member which constitutes an elastic gimbal which deforms elastically in response to blade loading to permit the hub to tilt in any direction relative to the rotor drive shaft or axis of rotation, but with a springlike resistance to such tilt.

It is still a further object of this invention to teach such a hingeless helicopter rotor in which the elastic gimbal constitutes a constant-speed universal joint between the rotor drive shaft and the rotor so that the rotational velocity of the rotor about the tilted or untilted axis will be constant and equal to the rotational velocity of the drive shaft.

It is still a further object of this invention to teach such a hingeless rotor in which the hub flexes to tilt about the axis of rotation and the blades bend or flex with respect thereto, each due to blade loading, to thereby reduce the angle between the rotor constant speed plane and the blade tip path to thereby reduce the Coriolis effect.

It is still a further object to teach a hingeless helicopter rotor in which the hub is filament wound, and is of substantially one-piece construction to form a cambered ellipsoid to thereby avoid aerodynamic download on the hub and blade roots at cruise angle of attack, which is nose-down in a conventional helicopter.

It is still a further object of this invention to teach such a hingeless helicopter rotor in which the rotor hub includes a flexible member, such as a diaphragm in its bottom wall, which diaphragm is a continuous disc extending radially outwardly from a central aperture connected to the drive shaft and which disc is constructed so that any radial cut taken therethrough will produce the same diaphragm cross-sectional shape so as to constitute a constant-speed universal joint.

It is still a further object of this invention to teach such a hingeless helicopter rotor in which the flexible diaphragm includes at least three radially extending sectors, which are equally spaced circumferentially about the axis of rotation and are of identical properties so as to constitute a constant-speed universal joint.

It is still a further object of this invention to teach such a hingeless helicopter with a desirably low equivalent hinge offset without compromising blade structure and while avoiding the problems of static droop and excessive aeroelastic response when starting or stopping the rotor in high winds, and in which the rotor has a low vibration.

It is still a further object of this invention to teach such a hingeless helicopter rotor in which the blade pitch change system and the blade retention system are contained within the hollow hub so as to be protected from weather and dirt, such that the systems add no drag to the rotor system, and such that the pitch change system and blade retention system are readily accessible for inspection and require no lubrication.

It is a further object of this invention to teach such a hingeless helicopter rotor having the benefits of high offset for static droop and start-stop operation in high winds, and the benefit of low offset for flying qualities, and low vibration and low vibratory hub moments.

It is a further object of this invention to teach such a helicopter hingeless rotor in which the flexible hub performs the blade centering function, permits hub tilt relative to the drive shaft with constant-speed universal joint action, provides spring restraint to the gimbal action, and transmits the 1/rev. flapwise shear forces which become steady hub moments, transmits torque from the rotor shaft to the blades, and is an integral streamlined unit of cambered ellipsoidal shape, and in which the center body carries centrifugal force from one blade to the other to assist in the blade centering function, carries steady flapwise bending from one blade to another, transmits lift loads from the blades to the hub, and provides a joint for blade removal.

Other objects of the present invention may be seen by referring to the following description and claims, read in conjunction with the accompanying drawings.

BRIEF DESCRIPTION OF THE DRAWINGS

FIG. 7 is a top view of one form which the bottom wall of my elastic gimbal hub may be.

FIG. 8 is a showing of another form which the bottom wall of my elastic gimbal hub may be.

FIG. 9 is a view taken along FIG. 9—9 of FIG. 7.

FIG. 10 is a schematic showing of a side view of my improved hingeless rotor showing a first apparatus for transmitting rotor lift load to the rotor drive shaft or helicopter.

FIG. 11 is a partial side view of my improved hingeless helicopter rotor showing a second apparatus for providing a lift load connection between the helicopter hub and the rotor drive shaft or fuselage.

FIG. 12 is a second embodiment of my hingeless rotor in which the hub is not of cambered ellipsoidal shape.

DESCRIPTION OF THE PREFERRED EMBODIMENT

It is believed that the best understanding of the subject matter of my invention will be realized by first appreciating the problems encountered in the prior art which my invention remedies.

Figure 1:
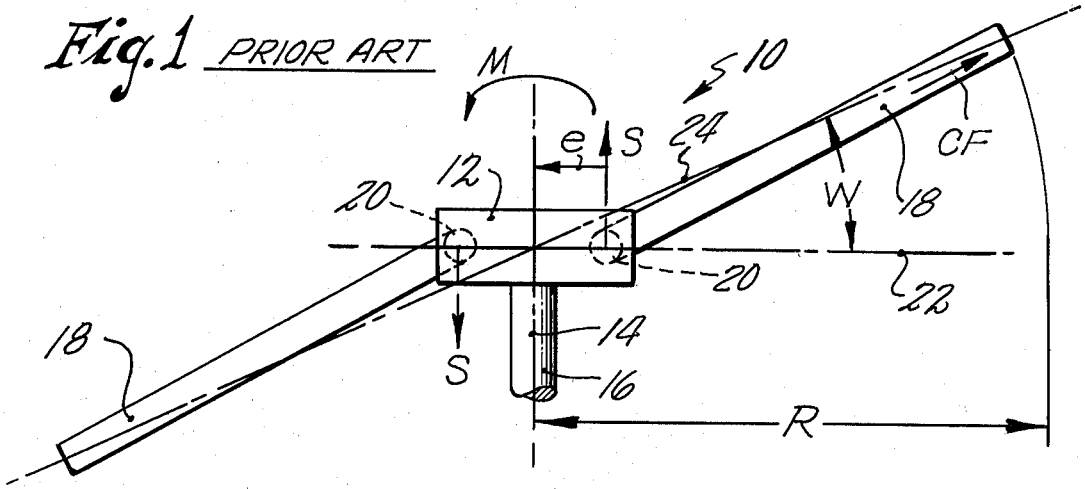
FIG. 1 is a schematic drawing of a prior art hinged helicopter rotor and is shown in a mode wherein it is producing a moment but not producing a lift force and is used to explain the significance of offset and offset ratio.

First considering the prior art conventional hinged rotor of FIG. 1 in which helicopter rotor 10 consists of a rigid hub 12 driven for rotation about axis of rotation 14 by drive shaft 16. A plurality of blades 18 extends substantially radially from hub 12 for rotation therewith and are connected thereto by hinges 20. Angle W is formed between the constant-speed plane 22 normal to the rotor shaft and the blade tip path plane 24 as the blades flap in operation. To simplify the analysis it is assumed in FIG. 1 that the rotor is producing a moment but not a lift force. The blade loads imparted to the hub are reacted at hinges 20 in the equal and opposite shear loads s indicated by arrows extending from the hinges. Since the hinges are displaced distance e from axis 14, the moment M created by these shear loads is twice the product e times s. For the prior art hinged rotor shown in FIG. 1, the offset ratio is defined as the offset of the hinge divided by the radius of the blade, i.e. R. Experience with the hinged rotors reveals that rotors having high offset ratios much in excess of 3 to 7 percent experienced serious vibration and high gust sensitivity problems, whereas most hinged rotors having offset ratios in the range of 3 to 7 percent had acceptable characteristics. Further, in the FIG. 1 construction, cyclic mode steady moment which results from 1/rev. vibratory shear loads is proportional to the offset, as is the N/rev. vibratory moments which result from N−1 and N+1/rev. vibratory shears where N is the number of blades on the rotor.

Figure 2:
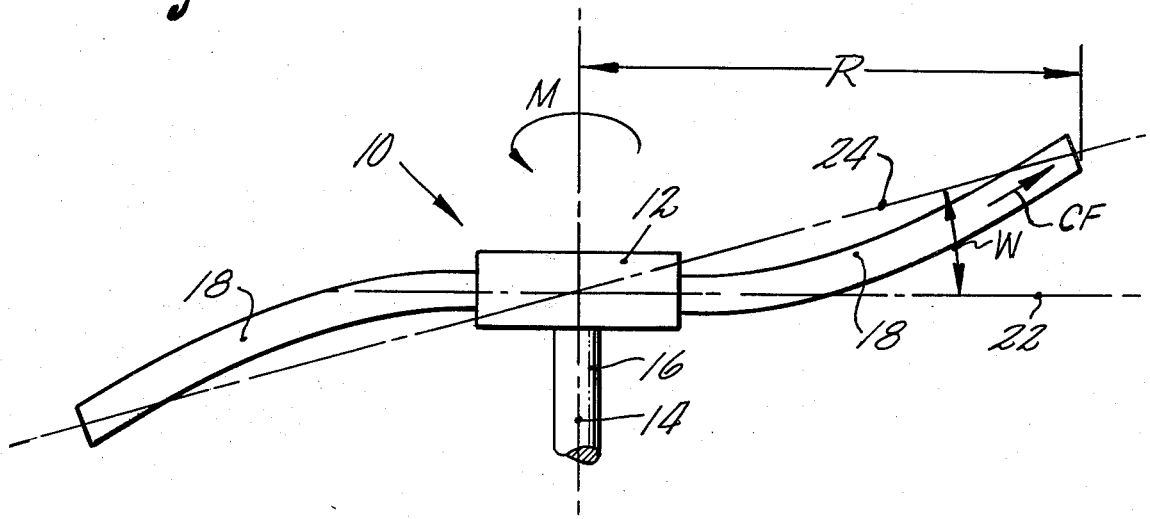
FIG. 2 is a schematic showing of the prior art hingeless helicopter rotor and is used to demonstrate the significance of equivalent offset and offset ratio.

Now referring to FIG. 2 we see a typical prior art hingeless rotor. For the purpose of better understanding, the same reference numerals will be used to describe corresponding parts in FIG. 2 as were used in FIG. 1, and this practice will be used throughout the specification. Again in FIG. 2, rigid hub 12 is mounted from the fuselage and solidly attached to rotor drive shaft for rotation about axis of rotation 14. Blades 18, of conventional stiff or more flexible design, project radially from the hub and are connected thereto for rotation therewith about axis 14. Rotor 10 of FIG. 2 may be of the type taught in U.S. Pat. Nos. 4,093,400 or 3,874,820. Blade tip path plane 24 is established by the bending of flexible blades 18 and forms angle W with constant speed plane of rotation 22. While there are no hinges in the Fig. 2 hinged rotor, there nonetheless is an equivalent offset which can be calculated using the following equation:

Equation 1: $M = N/2 \times CF \times W \times e_{(equiv.)}$

With the FIG. 2 rotor operating as shown therein, the quantity M, which is the moment created in the hingeless rotor by blade flapping, N is the number of blades in the rotor, CF, which is the centrifugal force of each blade generated by rotation and angle W are known quantities so that the equivalent offset $e_{(equiv.)}$ may be calculated and equivalent offset ratio, $e_{(equiv.)}/R$, obtained therefrom. The location of the equivalent offset $e_{(equiv.)}$ in the FIG. 2 hingeless rotor can be considered to be the axis about which the flexible blades can be considered to flap, during operation. This is known as the virtual flap hinge axis. In the hingeless rotor, the location of the equivalent offset must also be carefully established and controlled so that it falls into the proper range, such as the 3 to 7 percent range as in the hinged rotor of FIG. 1, since excessive vibration and gust response sensitivity problems are likely when the equivalent offset ratio exceeds these values.

In hingeless rotors, if we use stiff blades, the equivalent offset is high, and conversely, if we use flexible blades the equivalent offset is low. It would therefore appear that it would be logical to establish the required low offset and low equivalent offset ratio in the hingeless rotor to be in the 3 to 7 percent range by merely making the blades very flexible. While this would establish the desired low offset and offset ratio, it is not an acceptable solution because three serious problems are encountered when very flexible blades are used. First, an area of high stress concentration is created in the blade at the interface between the blade and the hub. Secondly, highly flexible blades experience severe static droop and there is always the likelihood that the blade could strike the ground. This problem is further accentuated by the fact that attempts to start-up or stop a helicopter rotor with highly flexible blades in a high wind condition produces excessive blade flapping due to the wind and this excessive flapping can prevent the helicopter rotor from being started or stopped. This static droop and flapping problem could be overcome by the incorporation of additional hardware of the type used in hinged rotors, however, the objective of a hingeless rotor is to produce a lightweight, simplified rotor which is free of all of these additional complications and hardware, and therefore the added hardware solution is unacceptable. The third disadvantage of using highly flexible blades is that when the blade flaps out of its plane of rotation 22, a Coriolis effect takes place and causes the blade flapping motion to be coupled with an undesirable lead-leg motion. The greater the angle W generated between the plane of rotation 22 and the tip path plane 24, the greater the Coriolis effect. It will therefore be seen that the use of highly flexible blades to produce the desired low offset ratio is undesirable for these several reasons.

Figure 3:
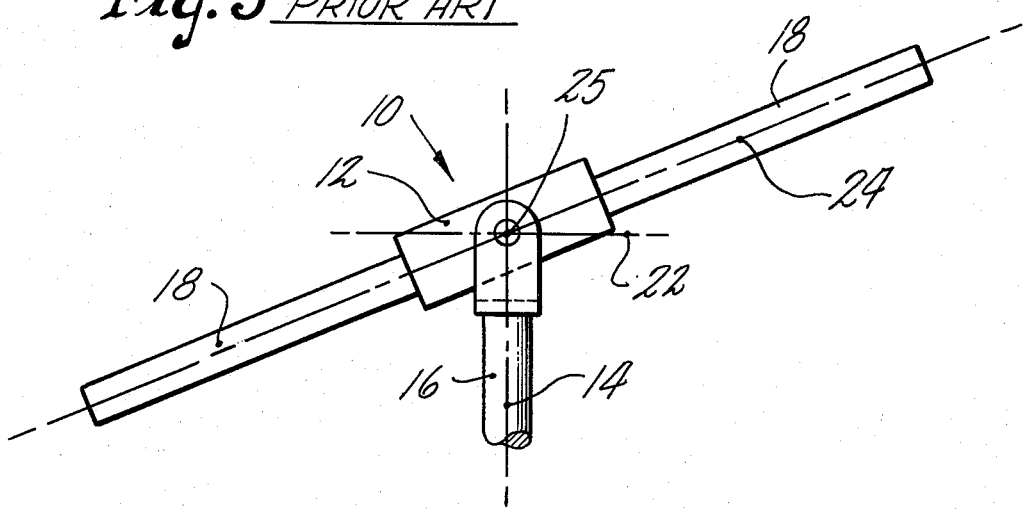
FIG. 3 is a schematic showing of the prior art mechanically gimballed rotor that is used to describe the disadvantages which accompany the zero offset benefits thereof.

In a purely mechanical gimballed rotor of the type shown as prior art in FIG. 3, hub 12 is supported from drive shaft 16 for pivotal gimbal motion about axis 25. Such a rotor is shown in greater detail in Gebhard U.S. Pat. No. 2,829,721. While the pure mechanical gimballed rotor produces zero offset, experience has shown that it also has flight control problems and Coriolis problems which makes this solution unacceptable for some applications.

Figure 4:
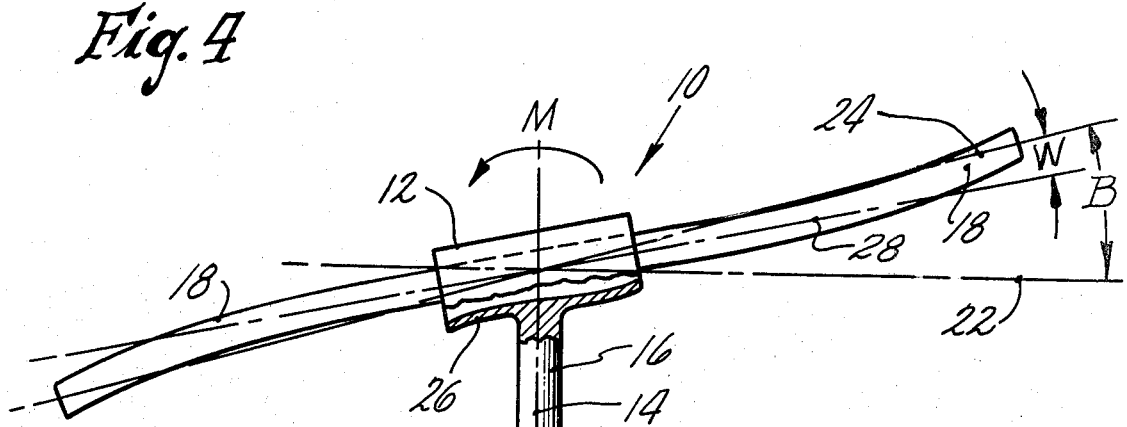
FIG. 4 is a schematic showing of my improved hingeless helicopter rotor in which the hub tilts and the blades bend or flex, each in response to blade loading, so as to coact to define the blade tip path pulse, and to minimize the angle between the blade tip plane and the plane of constant-speed rotation of the rotor.

My solution to the problem of providing a hingeless rotor with low equivalent offset and low equivalent offset ratio is shown schematically in FIG. 4 in which drive shaft 16 drives flexible hub 12 about axis of rotation 14, and blades 18 project from hub 12 for rotation therewith. Hub 12 is fabricated so that its bottom wall, or a portion thereof, 26 is flexible to the extent that it will be caused to tilt as shown in FIG. 4 about axis of rotation 14 and shaft 16 in response to blade loading of hub 12. This tilting of hub 12 is caused by elastic deformation of the flexible lower wall 26. This flexible lower wall 26 acts as an elastic gimbal which causes the plane of constant-speed rotation 28 to be at an angle to the drive shaft and axis 14 and to the unflexed plane of rotation 22. Because it is an elastic gimbal, tiltable hub 12 will cause rotor 10 to rotate at the same speed of rotation as drive shaft 16, both when tilted and untilted, and thereby avoid the problems discussed in the prior art section of this application relative to the Covington patent which would be encountered if a mechanical gimbal, the conventional Hooke's joint, were used to connect the hub to the drive shaft.

In the FIG. 4 construction, when subjected to loading, both the flexible hub 12 and the blades 18 flex or bend, and therefore share the flexing action required to establish blade tip path plane 24. Actually, when subjected to blade pitch moment and roll moment loads, flexible hub 12 and flexible blades 18 act as springs in series. It can be shown that the combined offset achieved by the use of flexible hub 12 and conventional flexible blades 18 together is less than would be achieved by using either conventional flexible blades 18 with a rigid hub or flexible hub 12 with a theoretically infinitely rigid blade. For example, the equivalent offset of conventional flexible blades 18 when used with a rigid hub, may be 15 percent R. The equivalent offset of flexible hub 12, when used with theoretically infinitely rigid blades may be 7.5 percent R, whereas, the equivalent offset of the combination of flexible hub 12 and conventional flexible blades 18 can be shown to be 5 percent R. This is substantiated by the following equation:

Equation 2: $e_{B+H} = \dfrac{1}{\left(\dfrac{1}{e_B}\right)\left(\dfrac{1}{e_H}\right)}$ Where $e_{B+H}$ is the offset achieved by the use of my flexible hub and blades, $e_B$ is the offset achieved by the use of conventional flexible blades with a rigid hub, and $e_H$ is the offset achieved by the use of a flexible hub with theoretically infinitely rigid blades.

It will therefore be seen that by the use of flexible hub 12 and conventional flexible blades 18 in the FIG. 4 construction, a hingeless rotor with low equivalent offset and low equivalent offset ratio can be achieved.

A further advantage of the FIG. 4 construction is reduced Coriolis effect. By viewing FIG. 4 it will be noted that, due to the flexible hub 12, the plane of constant speed rotation of the rotor is at 28, whereas it would have to continue to be at plane 22 if the hub did not flex. The benefit of this is that when the blade flexes or flaps to the position shown in FIG. 4, the angle between the blade generated blade tip path plane 24 and the constant-speed rpm plane 28, angle W, is substantially reduced from angle B, which would be the case without the hub flexing. Therefore a second benefit derived, in addition to reduced offset, by hub flexing is reduced Coriolis effect and therefore the reduced stresses and in-plane vibrations caused by the Coriolis effect, which are proportional to angle W. With respect to the significance of angle W it is important to note that this angle is a stronger function than a simple, direct proportionality in that some of the above undesirable effects are proportional to angle W, some are proportional to the square of angle W, and others are proportional to a function of angle W which is greater than unity.

Figure 6:
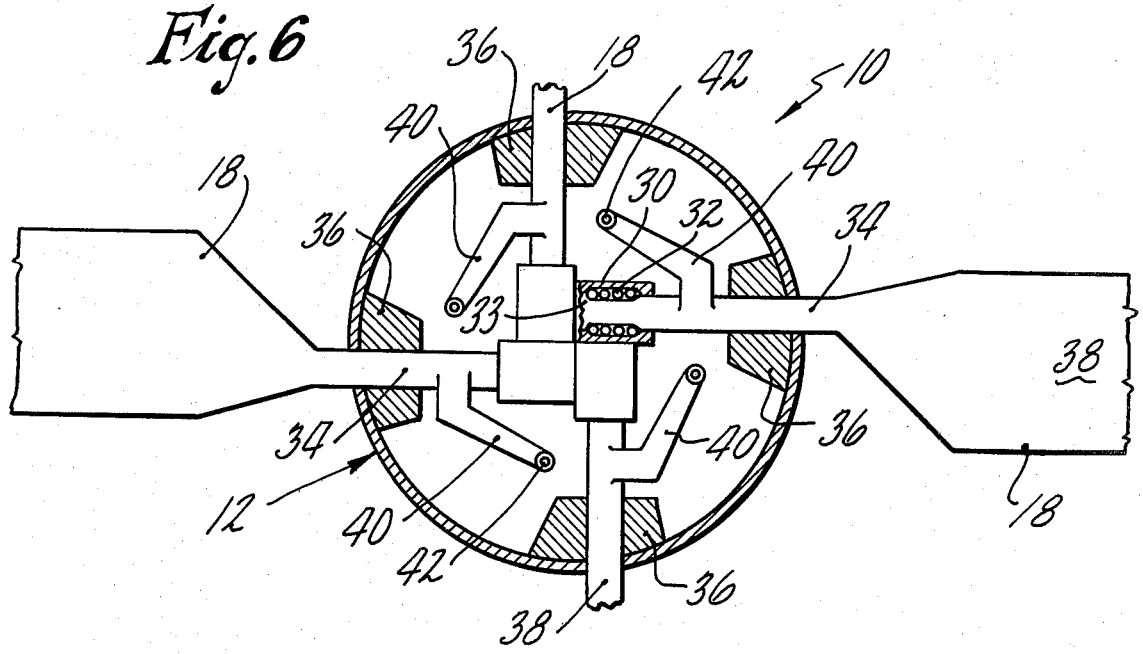
FIG. 6 is a top view, partially broken away of the FIG. 5 embodiment.
Figure 5:
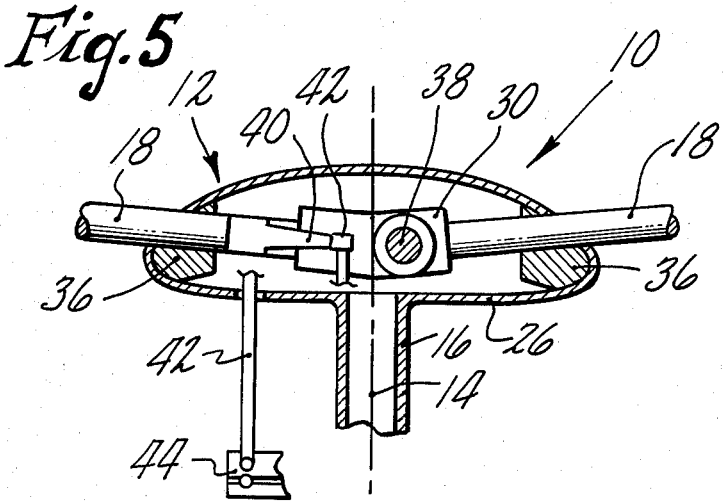
FIG. 5 is a side view, partially broken away of a practical embodiment of my improved hingeless rotor.

A practical embodiment of my FIG. 4 flexible hub, conventional blade hingeless rotor construction is shown in FIGS. 5 and 6, in which the same reference numerals are used as in the preceeding Figs. for purposes of clarity. Viewing FIGS. 5 and 6 we see helicopter hingeless rotor 10 includes flexible hub 12, which is mounted for rotation about axis 14 and driven by rotor drive shaft 16, a plurality of at least three conventional blades 18 project radially from hub 12 and supported thereby from rotation therewith about axis 14. Hub center body 30 is positioned within the hollow interior, or wall or shell of hub 12 and includes stack feathering bearings 32 which receive the root ends 33 of blade 18 herein for pitch change motion with respect thereto. Bearing 32 is preferably of the self lubricating variety or an elastomeric bearing. Shank portion 34 of the blade 18 passes through the hub wall by passing in journal bearing fashion through a rim block 36, which is fixedly positioned by adhesive or any other convenient fashion in the interior of hub 12 and made of plastic such as impregnated nylon or any other acceptable material to perform the firm connection function of a journal bearing and avoid the problem of chafing and wear which could otherwise take place at this junction due to the vibratory loads transmitted therethrough. Blade airfoil sections 38 extend radially outwardly from hub 12 for rotation therewith and perform the usual pitch change, and other motion functions of helicopter blades so as to generate required lift and helicopter control at pilot command. Pitch control horns 40 extend from the blade shank section 34 and each is connected to a control rod 42 so as to perform the conventional pitch change function as control rods 42 are caused to move either collectively or cyclicly by conventional swashplate 44.

It is very important to my FIGS. 5 and 6 construction that the bottom wall portion 26 of flexible hub 12 be fabricated so as to be elastically deformable under blade loading so as to tilt as shown in FIG. 4 in response to thereto so as to serve as an elastic gimbal and a constant-speed universal joint. With such a constant-speed universal joint, the speed of rotation of hub 12 is the same as the speed of rotation of shaft 16, both when hub 12 is in its untilted position shown in FIG. 5, and its tilted position shown in FIG. 4. The elastic gimbal provides a centering spring effect which permits the gimbal to transfer hub moments from the blades to the shaft and performs the function of a constant-speed universal joint without the usual mechanical complexity.

Flexible wall or diaphragm 26 of hub 12 may be fabricated as shown in FIG. 7 as a solid disc 46 which may be integral with drive shaft 16, or connected thereto for drive purposes by any conventional fashion such as bolted overlapping flanges. Central opening 48 is optional. In the FIG. 7 disc construction, any plane passing through axis 14 and radially through diaphragm 26, such as along line 9—9 and through axis of rotation 14, produces a structurally identically cross section. Preferably, to maintain uniform stresses due to torque load and gimbal action, that uniform section should be as shown in FIG. 9 so as to diminish in thickness as a nonlinear taper in a radially outward direction. In the FIGS. 5 and 9 construction, of course, apertures must be included in flexible diaphragm 26 to permit the passing of control rods 42 therethrough.

Another possible construction for flexible diaphragm 26 is as shown in FIG. 8 which includes a plurality of three or more sectors 50 of identical properties. Normally, the number of sectors 50 would be equal to the number of blades 18 and would extend between inner rim 52 which defines central opening 48 for connection to drive shaft 16, and outer rim 54. With either the FIG. 7 or the FIG. 8 construction, flexible diaphragm 26 will be an elastic gimbal and therefore a constant-speed universal joint.

While my preferred construction is as shown in FIGS. 5 and 6, FIG. 12 shows an alternate hingeless rotor construction with flexible hub and conventional blades but which is not of cambered ellipsoidal shape. In the FIG. 12 construction, hub center body 30 consists of a plurality of radially extending hub arms 70 which are joined so as to extend concentrically from axis 14, and each of which has a hollow cylinder so as to receive blade root 33 and cooperates with blade shank 34 to define blade feathering bearing 32. Hub arms 70 are connected to flexible diaphragm 26 by connecting members 72 in any conventional fashion. If the flexbeam rotor construction of U.S. Pat. No. 4,093,400 were to be used in the FIG. 12 construction, the cruiciform central spar support member would be connected to diaphragm 26 by members such as 72.

It is important to note that in my FIGS. 5 and 6 preferred construction, the elastic gimbal action of flexible hub 12 permits hub tilt relative to the drive shaft with constant-speed universal joint action, provides spring restraint to this gimbal action and therefore transmits 1/rev. flapwise shear forces which become a steady hub moment, transmits torque from the rotor shaft to the blades, transmits lift loads from the rotor to the drive shaft, and produces an integral, streamlined aerodynamic shape which is preferably a cambered ellipsoid so as to avoid the aerodynamic download on the hub and blade roots at cruise angle of attack, which is nose-down in the conventional helicopter. In this preferred construction, the center body 30 performs the functions of carrying the centrifugal force from one blade to another, carrying the steady flapwise bending from one blade to another, and provides a bearing for blade removal. It will further be evident that the coaction of the elastic hub and the center body centers the blades within the hub without the need for additional hardware. Further, since the flexing of the hub coacts with the flexing of the blade, a less flexible blade than would otherwise be required to obtain the required low effective offset may be used.

Flexible rotor hub 12 may be made integral with the upper portion of rotor drive shaft 16 by a conventional filament winding process, using fiberglass and epoxy, or other suitable material. The angle of the fibers is selected in conventional fashion to perform the required function of its location. Flexible rotor hub 12 may also be filament-wound without making it integral with the drive shaft 16. In this case, hub 12 would be wound to the final shape, and conventional mechanical attachments provided to connect it to drive shaft 16. Whether the fiber is wound separately from the shaft, or integrally from the shaft, this construction lends itself to producing a hub of the desired cambered ellipsoidal shape for optimum aerodynamics. A portion of the top half of the hub may be cut off after fabrication and replaced by a lighter-weight, non-structural cover to permit easy access to the internal parts of the rotor.

In some installations, it might be desirable to add mechanism for transferring rotor lift loads to the drive shaft or fuselage. Such constructions could be as shown in FIG. 10 wherein one or more tension strap members extend from and are attached to the drive shaft 16 and envelop center body 30 so as to transmit lift loads therefrom to the shaft or fuselage without impeding the ability of center body 30 to tilt with hub 14 in any direction with respect to shaft 16. A second alternate construction is shown in FIG. 11 in which spherical elastomeric bearing 60 joins center body 30 to hub 12 and hence shaft 16 and fuselage 58. It will be noted that in both the FIG. 10 and the FIG. 11 constructions, the spherical point of connection between the blades and the shaft lies in the plane of diaphragm 26. This produces a very compact construction which permits the desired gimballed ellipsoidal shape of the overall hub 14. It will be evident that diaphragm 26 may be integral with the remainder of hub 12 so as to be of one-piece construction.

It should be noted that in the FIGS. 10 and 11 constructions the lift connections between the hub and the drive shaft perform the single function of imparting rotor lift to the drive shaft and fuselage, and perform no part of the blade centering function, which is performed entirely by the coaction of the hub, blades and center body.

By viewing my FIGS. 5 and 6 preferred construction, it will be evident that this construction is a miminum drag, minimum turbulence construction which is light in weight and inexpensive because the parts may be made by highly automated manufacturing processes. This design is also maintenance-free with a minimal number of parts and no lubrication required within the hub. Further, a desirably low equivalent hinge offset is achieved without compromise to the blade structure and without the problems of static droop or excessive aeroelastic response when starting or stopping in high winds, the construction experiences low vibrations because the elastic gimbal alleviates the N−1 and the N+1 harmonics of vertical shear forces, and the Coriolis induced in-plane motion is greatly reduced by the tilting of the hub relative to the shaft, rather than requiring the blades to flap more extensively relative to the hub. A further advantage is that the blade pitch-change system and the blade retention system are both protected from weather, dirt and the like due to their location within the hollow hub, and are readily accessible for inspection. The preferred FIGS. 5 and 6 construction does not have wind sensitivity problems for starting or stopping the rotor because, when in the tilted condition, cancelling moments will be imposed against opposite blades by wind action.

With my construction, the required and desired low equivalent offset can be achieved while using rotor blades which are relatively stiff in flatwise bending, thereby avoiding critical stress concentration situations, and wind gust response. The stiffer blades also permit rotor start-up and shut-down operations in high wind conditions without encountering excessive blade motion excursions or requiring the complexity of blade flapping lock systems at low rotational speeds. The aforementioned reduced Coriolis in-plane motion of the blade will also allow a lightweight blade design to be stiff in-plane, that is, at the first in-plane frequency above the 1/rev., thereby eliminating ground resonance concerns.

It will therefore be seen that my elastic gimbal rotor has the benefit of not compromising blade structure to achieve low offset, has the benefit of high offset from a static droop and start-stop in high wind situations because, in view of the deflection of the hub the blade can be made stiffer than would otherwise be required to achieve the low offset, has the flying qualities and vibration benefits of low offset as well as the low vibration hub moments of low offset, and finally has reduced vibratory in-plane forces due to reduced Coriolis effects.

I wish it to be understood that I do not desire to be limited to the exact details of construction shown and described, for obvious modifications will occur to a person skilled in the art.

I claim:

1. A hingeless helicopter rotor adapted to be mounted for rotation from the fuselage about an axis of rotation and having a low equivalent offset comprising:
   (A) a hub mounted for rotation about the axis of rotation and having:
      (1) a flexible diaphragm forming the hub bottom wall portion and extending when unloaded in a plane substantially perpendicular to the axis of rotation and being of selected flexibility so as to be tiltable with respect thereto due to elastic deformation in response to blade loading imparted thereto so that the flexible diaphragm acts as an elastic gimbal to produce a constant-speed universal joint action thereacross unaffected by hub tilting, and
   (B) a hub center body connected to said hub for rotation therewith and including blade root attachment means to accommodate blade pitch change motion and adapted to receive the blade roots so that the blade centrifugal force is imparted to the hub center body therethrough,
   (C) at least three blades extending radially from said hub with equal circumferential spacing therebetween and having root sections connected to the center body blade attachment means for centrifugal force support therefrom and pitch change motion with respect thereto and extending radially therefrom to present blade airfoil sections outboard thereof and to produce lead-lag and flapping motion with respect thereto, so that the blades impose cancelling centrifugal loads on the center body, so that said blades, hub and center body coact to center said blades on said hub, and so that the flexing of the hub and flexing of the blades in response to blade loading coact to produce a low equivalent offset rotor, and to establish the tilt of the rotor blade tip path plane relative to the axis to thereby minimize blade flexing and reduce the angle between the rotor constant speed plane and the blade tip path plane to minimize Coriolis effect, and (D) means to selectively vary the pitch of said blades both collectively and cyclicly.

2. A helicopter rotor according to claim 1 and including a rotor drive shaft concentric about the axis of rotation and integrally connected to said flexible diaphragm.

3. A helicopter rotor according to claim 2 wherein the wall thickness of said flexible diaphragm decreases in a radial direction.

4. A helicopter rotor according to claim 3 and wherein said flexible diaphragm is a solid disc connected to said rotor drive shaft and being fabricated so that the cross-sectional shape defined by any radial cut therethrough is the same throughout the circumferential periphery.

5. A helicopter rotor according to claim 2 and wherein said flexible diaphragm is connected to said rotor drive shaft and further includes at least three radially directed sectors of identical shape and physical properties equally spaced circumferentially therearound.

6. A helicopter rotor according to claim 1 wherein said flexible diaphragm is of high tensile strength filament wound and bonded construction.

7. A helicopter rotor according to claim 2 and including means to connect said center body to said drive shaft or fuselage for tilting motion in any direction with respect thereto, and to transfer rotor lift loads from the center body to said drive shaft or fuselage.

8. A helicopter rotor according to claim 7 and wherein said connecting means comprises a high tensile strength flexible strap member connecting the center body to the drive shaft or fuselage so as to be freely tiltable at the plane of the hub bottom wall portion.

9. A helicopter rotor according to claim 7 wherein said connecting means comprises a spherical bearing centered on the axis of rotation in the plane of the hub bottom wall portion and connecting said center body to said drive shaft or fuselage for free tiltable motion with respect thereto about said spherical bearing.

10. A helicopter rotor according to claims 8 or 9 wherein said center body connecting means provides a spherical connection lying in the plane of said flexible diaphragm between the center body and the drive shaft or fuselage.

11. A helicopter rotor according to claim 1 and including a dome shaped top portion attached to and cooperating with said bottom wall portion to form a substantially hollow hub of cambered ellipsoidal shape, and further wherein said hub center body is positioned within said hub hollow interior.

12. A helicopter rotor according to claim 1 and having an equivalent offset ratio in the range of 3 to 7 percent.

* * * * *